Figure 1:
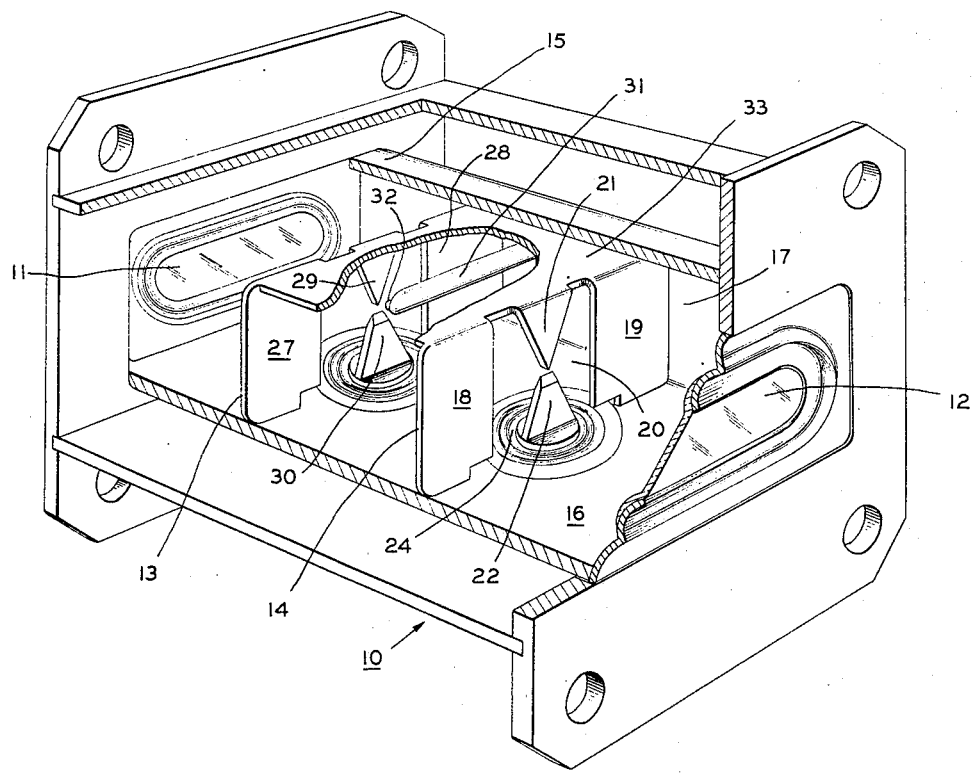

Jan. 15, 1957    E. J. WHITMORE ET AL    2,777,972
WAVEGUIDE DISCHARGE CELLS
Filed Jan. 18, 1954

INVENTORS
Edward John Whitmore
George Seymour Baldock
BY Cameron, Kerkam + Sutton
ATTORNEYS

United States Patent Office 2,777,972
Patented Jan. 15, 1957

2,777,972

WAVE GUIDE DISCHARGE CELLS

Edward John Whitmore and George Seymour Baldock, Edinburgh, Scotland, assignors to Ferranti Limited, Hollinwood, England, a company of the United Kingdom of Great Britain and Northern Ireland Application January 18, 1954, Serial No. 404,704

Claims priority, application Great Britain January 22, 1953

4 Claims. (Cl. 315—39)

This invention relates to waveguide discharge cells, by which is meant TR cells and gas attenuators.

A simple TR cell generally consists of a pair of electrodes surrounded by ionizable gas at low pressure and associated with some sort of resonant circuit, such as a tuned slot or cavity. The cell is usually located across a transmission system and the arrangement is such that when the transmission-line energy at the frequency to which the resonant circuit is tuned exceeds a predetermined value a discharge takes place between the electrodes with the result that the cell acts in effect as a short circuit across the line.

In order to ensure that the cell fires, there is usually provided in association with one of the main electrodes an auxiliary or "keep-alive" electrode to maintain a priming discharge between itself and that main electrode.

A typical use of such a cell is to protect a radar receiver from the energy radiated by the transmitter, especially when the two share a common aerial. Such a use is very well known and will not be described in detail.

A gas attenuator is similar in appearance and construction to a TR cell but is designed to afford considerable interaction between the "keep-alive" discharge and the R. F. field at low power levels where the R. F. voltage between the main electrodes is insufficient to cause a discharge to take place. In a gas attenuator, therefore, the electrode corresponding to the keep-alive electrode of a TR cell is energized with a control voltage so as to vary the degree of attenuation provided by the cell.

The term "cell," where used hereinafter without qualification, should be understood to mean a waveguide discharge cell, that is, either a TR cell or gas attenuator. Similarly the phrase "cell element" should be understood to mean an element of a TR cell or gas attenuator.

The leakage energy of a TR cell having only one pair of electrodes is considerable, particularly the spike leakage energy, by which is meant the energy that passes in the time interval between the application of an incident R. F. pulse and the establishment of the R. F. discharge.

In the case of a gas attenuator, the variation of attenuation with control voltage is not so large as might be desired.

It is known to reduce the spike leakage energy of a TR cell or to increase the response of a gas attenuator to its control voltage by providing a section of waveguide having at axially spaced intervals a number of cell elements each comprising a pair of electrodes forming part of a resonant circuit. Each end of the section is closed by an insulation-covered slot to retain the gas filling, which is of course common to all the elements. The axial spacing between the cell elements and the two end slots is equal to a quarter wavelength of the centre frequency of the operative band.

A similar arrangement is used to modify the band-pass characteristics of TR cells.

A disadvantage of cells of this known type is that it is impracticable to construct them closely to the desired theoretical bandwidth. The latter can be calculated only on the assumption that each cell element is infinitely thin along the waveguide axis, whereas in practice each element has an appreciable thickness. The use of thin sheet metal might be thought to provide a solution to the difficulty; but in practice the thinness is limited by considerations of mechanical rigidity, especially as one of the electrodes has usually to be made adjustable relative to the other to allow or gap adjustment and this electrode is therefore made in the form of a cone or peg. This is particularly the case where one electrode is made as a cone section to contain a keep-alive electrode.

A further disadvantage of cells of this type is due to the fact that the length of the gap between the electrodes of each cell element must be kept small to minimize leakage power. This increases the Q value of the associated resonant circuit, of which of course the gap forms a capacitive part, and so decreases the bandwidth of the cell. Such an undesired increase in the Q value is also brought about when the operative surface of a main electrode is enlarged to surround a keep-alive electrode.

An object of the present invention is to provide a waveguide discharge cell, that is, a TR cell or gas attenuator, of improved kind.

A further object of the invention is to provide a TR cell in which the spike leakage energy is reduced, or a gas attenuator having an increased response to its control voltage, the band-pass of which TR cell or attenuator realizes in practice to a close approximation the theoretically estimated width.

In accordance with the present invention a waveguide discharge cell comprises a waveguide section containing a plurality of cell elements each of which includes a pair of co-operating main discharge electrodes formed as flat metallic sheets across said waveguide section, the operative surfaces of the electrodes being in the form of straight knife edges at an angle to each other in the range 45 to 90 degrees inclusive.

The term "sheet" as used in this specification is intended to denote a thickness of the order of 0.02 inch.

Figure 2:
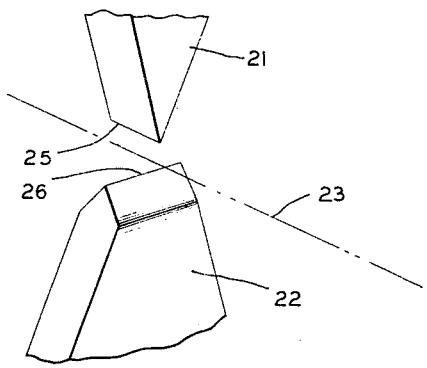

In the accompanying drawings,

Figure 1 is a view in perspective, with parts shown broken away, of a waveguide discharge cell in accordance with one embodiment of the invention, and Figure 2 is a detail to an enlarged scale of part of the embodiment shown in Figure 1.

In carrying out the invention in accordance with one form by way of example, see the accompanying drawings, a TR cell or gas attenuator comprises a section 10 of a rectangular waveguide sealed off at the ends by glazed slots 11 and 12 and containing two cell elements 13 and 14. The spacing, along the waveguide axis, between the two elements and between each element and the adjacent glazed slot is equal to a quarter wavelength of the centre frequency of the operative band. The section is filled with ionizable gas at low pressure.

To simplify the description it will be assumed that the waveguide section is mounted with the broader faces 15 and 16 horizontal. These faces will be referred to as the top and the base, respectively. The other two faces, one of which is not shown at all, being supposed broken away, and the other of which is shown at 17, will be referred to as the sides.

Cell element 14 is formed of four coplanar members of metallic sheet lying across the guide. Two of these members 18 and 19 are rectangular and extend inwards from the sides of the guide to its full depth to form a central aperture 20. Within this aperture are the other two members in the form of two triangular electrodes 21 and 22 with their bases on the top and base of the guide respectively and their apexes almost touching each other on the axis 23 (see Fig. 2) of the waveguide section. All four members are in electrical contact with each other so as to form in effect a resonant slot having a constriction across which a discharge is readily initiated.

The base of lower electrode 22 is secured to a metallic diaphragm 24, which forms a flexible part of the base 16 of the guide, and arrangements (not shown) are made for advancing or retracting this electrode towards or away from the upper electrode 21 with a fine degree of control, for tuning purposes.

The apex of upper electrode 21—see Fig. 2—is ground to a straight knife-edge 25 parallel to the guide axis 23. The apex of electrode 22 is also ground to a straight knife-edge 26 but this edge is orientated at right angles to the other knife-edge 25 and is normal to the plane containing edge 25 and the guide axis 23. Knife-edges 25 and 26 constitute the operative surfaces of the electrodes.

The other cell element 13 is constructed in an exactly similar manner to cell element 14 and accordingly a detailed description of it is unnecessary. The rectangular members are shown at 27 and 28, the upper electrode at 29 and the lower electrode at 30.

One of the cell elements—element 13 as depicted—is provided with a keep-alive electrode 31 where the device is a TR cell, or an equivalent electrode where the device is a gas attenuator. This may be in the form of an insulated conductor extending inwards alongside the cell element from side 17 of the guide with the bared end 32 of the conductor closely adjacent to that one of the two main electrodes of element 13 with which the priming discharge is to be formed; in the present case it is assumed that this electrode is the upper electrode 29 of the cell element.

It will be appreciated that as each cell element is formed of thin sheet metal without any thickening at the electrodes the construction above described allows the cell to be manufactured to a bandwidth very close to that calculated on the assumption that each cell element is infinitely thin.

Moreover, the use of electrodes whose operative surfaces are knife-edges at right angles to each other brings two important advantages. Firstly, the inter-electrode capacitance is reduced to a very low value, with the effect that the resulting low value of the Q for each cell element enables a greater bandwidth to be achieved, whilst retaining the small spacing necessary to reduce the energy leakage, than would otherwise be the case with two cell elements. Secondly, the alignment of the two electrodes of each element is less critical than in previous arrangements, so that the assembly of the cell is somewhat facilitated and the manufacture accordingly cheapened.

The immovable electrodes—in this example the upper electrodes 21 and 29—of the two cell elements, together with the rectangular members 18 and 19 of element 14, and 27 and 28 of element 13, which assist in forming the resonant circuits of the elements, may be stamped out of a single plane sheet of metal which is subsequently bent into a tray-like shape with the two electrodes and the associated rectangular members in parallel with each other at the quarter wavelength spacing as depicted in Fig. 1. This tray may then be slid into the guide until the two electrodes formed by it are in register with the movable electrodes 22 of element 14 and 30 of element 13 with which they co-operate. The interconnecting plate 33 of the tray then naturally lies in contact with the under surface of the top 15 of the guide but its presence here has little effect on the transmitting properties of the section.

In order to retain the tray securely in position prior to and during brazing, an aperture may be formed in the interconnecting plate 33 of the tray and engaged by the exhaust tubulation of the cell; these features do not appear in the drawings since they form parts of the waveguide section that are broken away to reveal the interior. Such an aperture is also of use in locating the blank in the press tool which bends the tray into shape.

Various details of the above-described embodiment may be modified within the scope of the invention. For example the knife-edges need not be at right angles to each other as long as the angle between them is within the range 45 to 90 degrees inclusive. The right angle arrangement is however necessary if the maximum advantage as regards low Q value and uncritical alignment of electrodes is to be obtained.

What is claimed is:

1. A waveguide discharge cell comprising a waveguide section containing a plurality of cell elements each of which includes a pair of co-operating main discharge electrodes formed as flat metallic sheets across said waveguide section, the operative surfaces of the electrodes being in the form of straight knife edges at an angle to each other in the range 45 to 90 degrees inclusive.

2. A waveguide discharge cell comprising a waveguide section containing a plurality of cell elements each of which includes a pair of co-operating main discharge electrodes formed as flat metallic sheets across said waveguide section, the operative surfaces of the electrodes being in the form of straight knife edges at an angle to each other in the range 45 to 90 degrees inclusive, and one of said electrodes being mounted on a flexible metallic portion of the wall of said waveguide section to allow of movement of the electrode so mounted in directions towards and away from the other electrode for tuning purposes.

3. A waveguide discharge cell comprising a waveguide section containing a plurality of cell elements each of which includes a pair of co-operating main discharge electrodes formed as flat metallic sheets across said waveguide section, the operative surfaces of the electrodes being in the form of straight knife edges at right angles to each other, one edge being parallel to the axis of said waveguide section.

4. A waveguide discharge cell comprising a waveguide section containing a plurality of cell elements each of which includes a pair of co-operating main discharge electrodes formed as flat metallic sheets across said waveguide section, the operative surfaces of the electrodes being in the form of straight knife edges at right angles to each other, one edge being parallel to the axis of said waveguide section, and one of said electrodes being mounted on a flexible metallic portion of the wall of said waveguide section to allow of movement of the electrode so mounted in directions towards and away from the other electrode for tuning purposes.

References Cited in the file of this patent

UNITED STATES PATENTS

| 2,531,122 | Fiske | Nov. 21, 1950 |
| 2,632,867 | Garoff et al. | Mar. 24, 1953 |
| 2,652,618 | Prescott | Sept. 22, 1953 |
| 2,658,147 | Bainbridge | Nov. 3, 1953 |